(12) United States Patent
Sekiguchi

(10) Patent No.: US 8,726,291 B2
(45) Date of Patent: May 13, 2014

(54) JOB EXECUTION APPARATUS, IMAGE FORMING APPARATUS, COMPUTER READABLE MEDIUM AND JOB EXECUTION SYSTEM

(75) Inventor: Yumi Sekiguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 280 days.

(21) Appl. No.: 13/041,515

(22) Filed: Mar. 7, 2011

(65) Prior Publication Data

US 2012/0042323 A1    Feb. 16, 2012

(30) Foreign Application Priority Data

Aug. 11, 2010   (JP) ................................. 2010-180081

(51) Int. Cl.
*G06F 9/46*    (2006.01)
(52) U.S. Cl.
USPC ......................................................... 718/106
(58) Field of Classification Search
None
See application file for complete search history.

(56) References Cited

U.S. PATENT DOCUMENTS

| | | | | |
|---|---|---|---|---|
| 6,762,857 | B1* | 7/2004 | Salgado et al. | 358/1.9 |
| 2003/0103777 | A1* | 6/2003 | Nakamura et al. | 399/82 |
| 2006/0072148 | A1* | 4/2006 | Kovnat et al. | 358/1.15 |

FOREIGN PATENT DOCUMENTS

| | | |
|---|---|---|
| JP | 10-067146 A | 3/1998 |
| JP | 10-240467 A | 9/1998 |

* cited by examiner

*Primary Examiner* — Mengyao Zhe
(74) *Attorney, Agent, or Firm* — Sughrue Mion, PLLC

(57) ABSTRACT

A job execution apparatus includes: a receiving unit configured to receive each job; a calculation unit configured to calculate an index value representing a load needed to execute each of a pre-processing sub-job and a post-processing sub-job when each of n jobs (n is a natural number equal to or more than 2) is decomposed into a pre-processing sub-job for generating information, and a post-processing sub-job for causing an output unit to output information generated by executing the pre-processing sub-job; a pre-processing execution unit configured to sequentially execute pre-processing sub-jobs which are respectively included in jobs received by the receiving unit and registered in a pre-processing sub-job queue; and a post-processing execution unit configured to sequentially execute, upon completion of the pre-processing sub-jobs, post-processing sub-jobs which are respectively included in the received jobs and which are registered in a post-processing sub-job queue.

8 Claims, 11 Drawing Sheets

FIG. 7

EXAMPLE OF REGISTERED JOBS

| ORDINAL NUMBER | JOB ID | FILE NAME | NUMBER OF COPIES | NUMBER OF PAGES | DOCUMENT TYPE | PREDICTED IMAGE PROCESSING TIME | PREDICTED PRINT PROCESSING TIME |
|---|---|---|---|---|---|---|---|
| 1 | J1 | AA. Doc | 1 | 1 | STANDARD DOCUMENT | P1 | 01 |
| 2 | J2 | BB. Pp | 10 | 50 | PRESENTATION MATERIAL | P2 | 02 |
| 3 | J3 | CC. Html | 1 | 3 | WEBPAGE | P3 | 03 |
| 4 | J4 | DD. Xls | 5 | 4 | STANDARD DOCUMENT | P4 | 04 |
| ⋮ | | | | | | | |

…
JOB EXECUTION APPARATUS, IMAGE FORMING APPARATUS, COMPUTER READABLE MEDIUM AND JOB EXECUTION SYSTEM

CROSS-REFERENCE TO RELATED APPLICATION

This application is based on and claims priority under 35 USC 119 from Japanese Patent Application No. 2010-180081 filed on Aug. 11, 2010.

BACKGROUND

Technical Field

The present invention relates to a job execution apparatus, an image forming apparatus, computer readable medium, and a job execution system.

SUMMARY

According to an aspect of the invention, a job execution apparatus includes:

a receiving unit configured to receive each job;

a calculation unit configured to calculate an index value representing a load needed to execute each of a pre-processing sub-job and a post-processing sub-job when each of n jobs (n is a natural number equal to or more than 2) is decomposed into a pre-processing sub-job for generating information, and a post-processing sub-job for causing an output unit to output information generated by executing the pre-processing sub-job;

a pre-processing execution unit configured to sequentially execute pre-processing sub-jobs which are respectively included in jobs received by the receiving unit and registered in a pre-processing sub-job queue;

a post-processing execution unit configured to sequentially execute, upon completion of the pre-processing sub-jobs, post-processing sub-jobs which are respectively included in the received jobs and which are registered in a post-processing sub job queue; and a control unit configured to control an order of executing the pre-processing sub-jobs at the pre-processing execution unit by referring to the index values which are calculated by the calculation unit and which are respectively correspond to the pre-processing sub-job and the post-processing sub-job of each of the received jobs, and by changing information registered in the pre-processing sub-job queue according to a result of comparison between a predicted post-processing time corresponding to the post-processing sub-job of an i-th job ($1 \leq i < n$) and the predicted pre-processing time corresponding to a pre-processing sub-job of the i-th or later job.

BRIEF DESCRIPTION OF THE DRAWINGS

Exemplary embodiments of the invention will be described in detail based on the following figures, wherein:

FIG. 7 is a table illustrating an example of a list of jobs received by the present exemplary embodiment.

DETAILED DESCRIPTION

Hereinafter, preferred exemplary embodiments of the invention are described with reference to the accompanying-drawings.

Exemplary Embodiment 1

Figure 1:
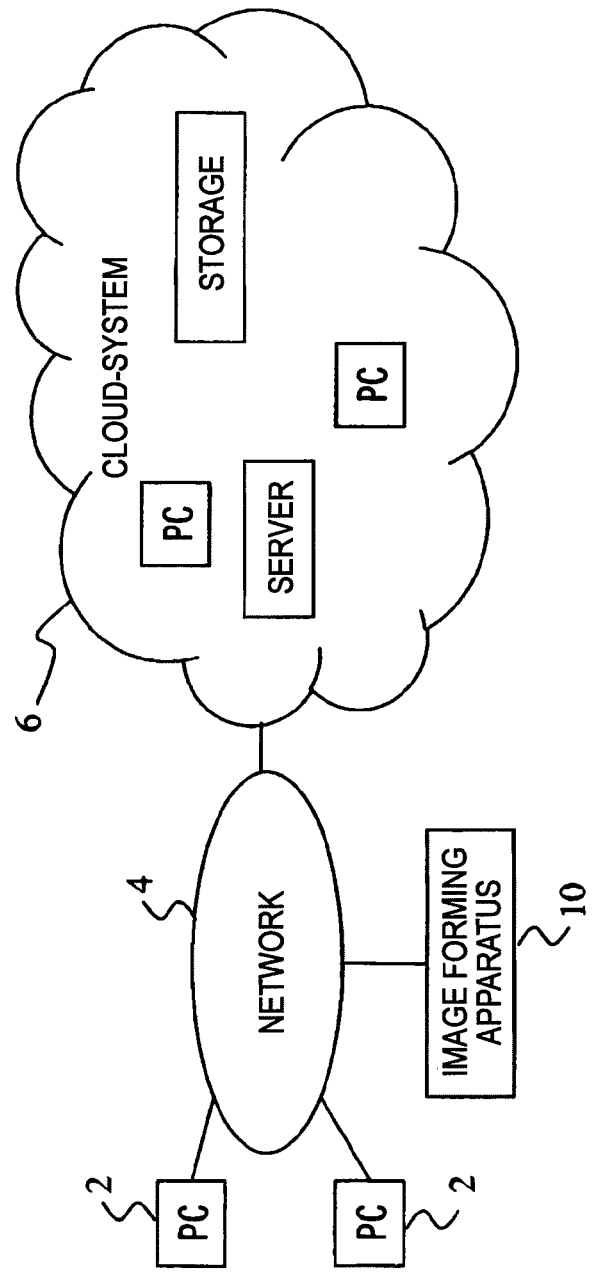
FIG. 1 is a diagram illustrating the entire configuration of an exemplary embodiment of a job execution system having an image forming apparatus according to the invention.

FIG. 1 is a diagram illustrating the entire configuration of an exemplary embodiment of a job execution system having an image forming apparatus according to the invention. FIG. 1 illustrates a configuration in which personal computers (PCs) 2, an image forming apparatus 10, and a cloud-system 6 are connected to one another via a network 4. Each of the PCs 2 and the image forming apparatus 10 is illustrated as an example of the job execution apparatus according to the invention. In the present exemplary embodiment, the image forming apparatus 10 is described as an example of the job execution apparatus. The image forming apparatus 10 according to the present exemplary embodiment is an apparatus having a plurality of functions, such as a scanner function and a print function. The image forming apparatus 10 receives jobs sent from the PCs 2 or based on instructions input from a user interface of the image forming apparatus 10 and executes image processing, print processing, and the like. The term "cloud" is an abbreviation of "cloud computing". The image forming apparatus 10 executes jobs according to job execution requests from the job execution apparatus according to the invention and returns results of the jobs thereto. The cloud-system 6 is equivalent to an external job execution apparatus and doesn't always have functions equivalent to those of the job execution apparatus according to the invention.

Although FIG. 1 illustrates the two PCs 2 and the single image forming apparatus 10, the types, the number and the connection-topology of apparatuses connected directly or indirectly to the network 4 according to the invention are not limited to those thereof. Although the network 4 is configured, for convenience, by a single network, the connection-topology of the network 4 is not limited to an example illustrated in FIG. 1, as long as the image forming apparatus 10 may access the cloud-system 6.

Figure 2:
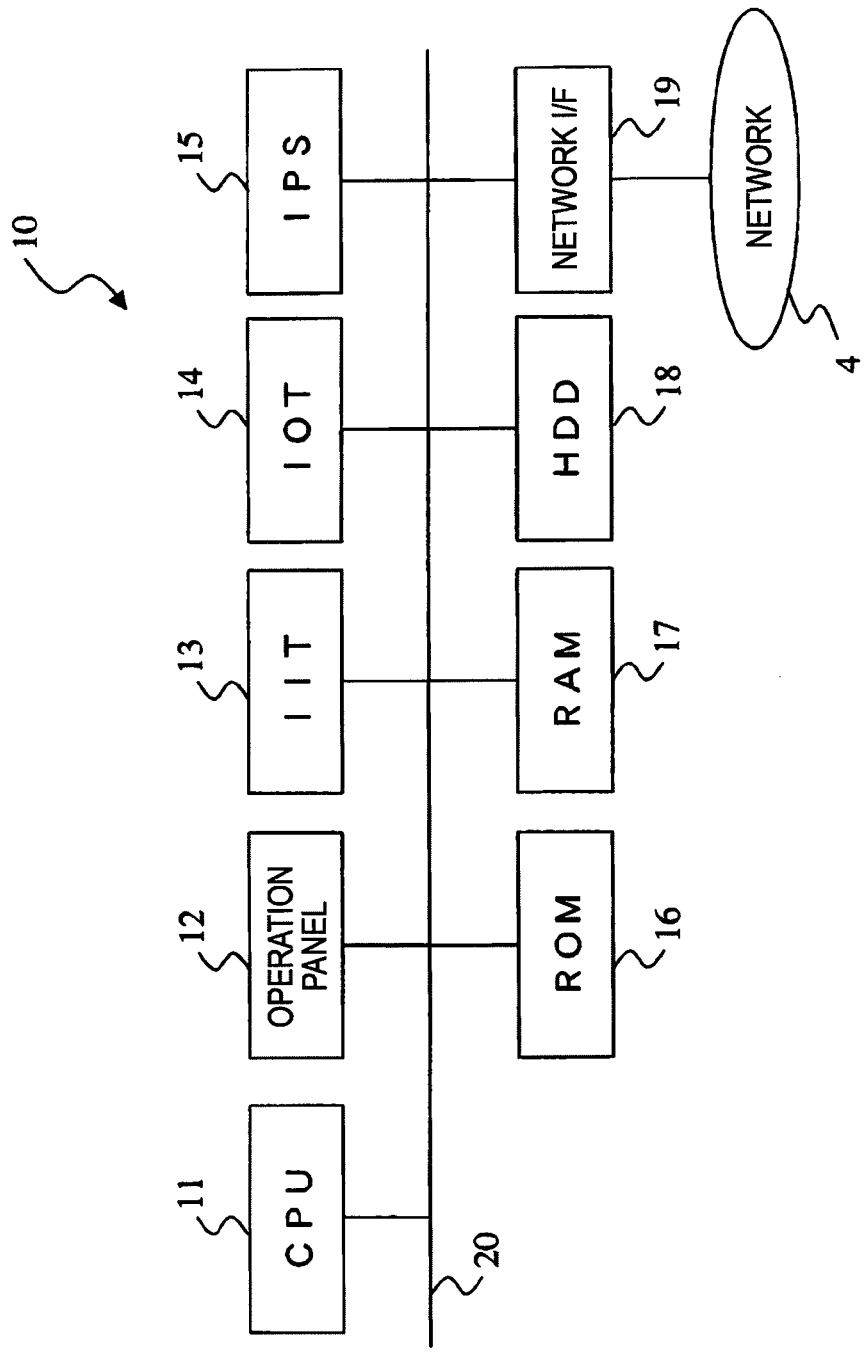
FIG. 2 is a diagram illustrating an example of the hardware configuration of an image forming apparatus 10 according to the present exemplary embodiment.

FIG. 2 is a diagram illustrating an example of the hardware configuration of the image forming apparatus 10 according to the present exemplary embodiment. The image forming apparatus 10 is an apparatus which has various functions, as described above, and which also has a built-in computer. In FIG. 2, a central processing unit (CPU) 11 controls operations of various devices, such as an image input terminal (IIT) 13 and an image output terminal (IOT) 14, mounted in the present apparatus according to a program stored in a read-only memory (ROM) 16. The IIT 13 refers to an image input device. The IIT 13 reads an original-document set by a user, and stores the read document as electronic data in a hard disk drive (HDD) 18 or the like. The IIT 13 may be implemented by, e.g., a scanner. The IOT 14 refers to an image output device, and prints images on output paper according to instructions issued from a control program executed by the CPU 11. An address data bus 20 is connected to the various devices serving as control targets of the CPU 11 to perform data communication thereamong. An operation panel 12 receives instructions from users and displays information. In the present exemplary embodiment, a job is generated in response to an input from the operation panel 12. An image processing system (IPS) 15 refers to an image processing device, and executes image processing included in a received job. The ROM 16 stores various programs relating to the control of the present apparatus, a cipher of electronic data, and the transmission/reception thereof. The execution of the various programs enables each component described below to fulfill a predetermined processing function. A random access memory (RAM) 17 is utilized as a work memory during the execution of the programs, and as a communication buffer during the transmission/reception of the electronic data. In the present exemplary embodiment, the RAM 17 may be utilized for storing a job queue. The HDD 18 stores electronic documents and the like, which are read using the IIT 13. A network interface (I/F) 19 is connected to the network 4 and utilized for transmission of electronic data generated by the present apparatus, reception of electronic mails transmitted to the present apparatus, and access to the present apparatus via a browser. In the present exemplary embodiment, the I/F 19 is used while information exchange among the PCs 2 and the cloud-system 6 is performed.

The PC 2 according to the invention is implemented by a general-purpose computer equipped with a CPU, a ROM, a RAM, a HDD, input means such as a mouse and a keyboard, a display, a network controller, and the like. Therefore, in the present exemplary embodiment, each PC 2 is not specifically illustrated.

Figure 3:
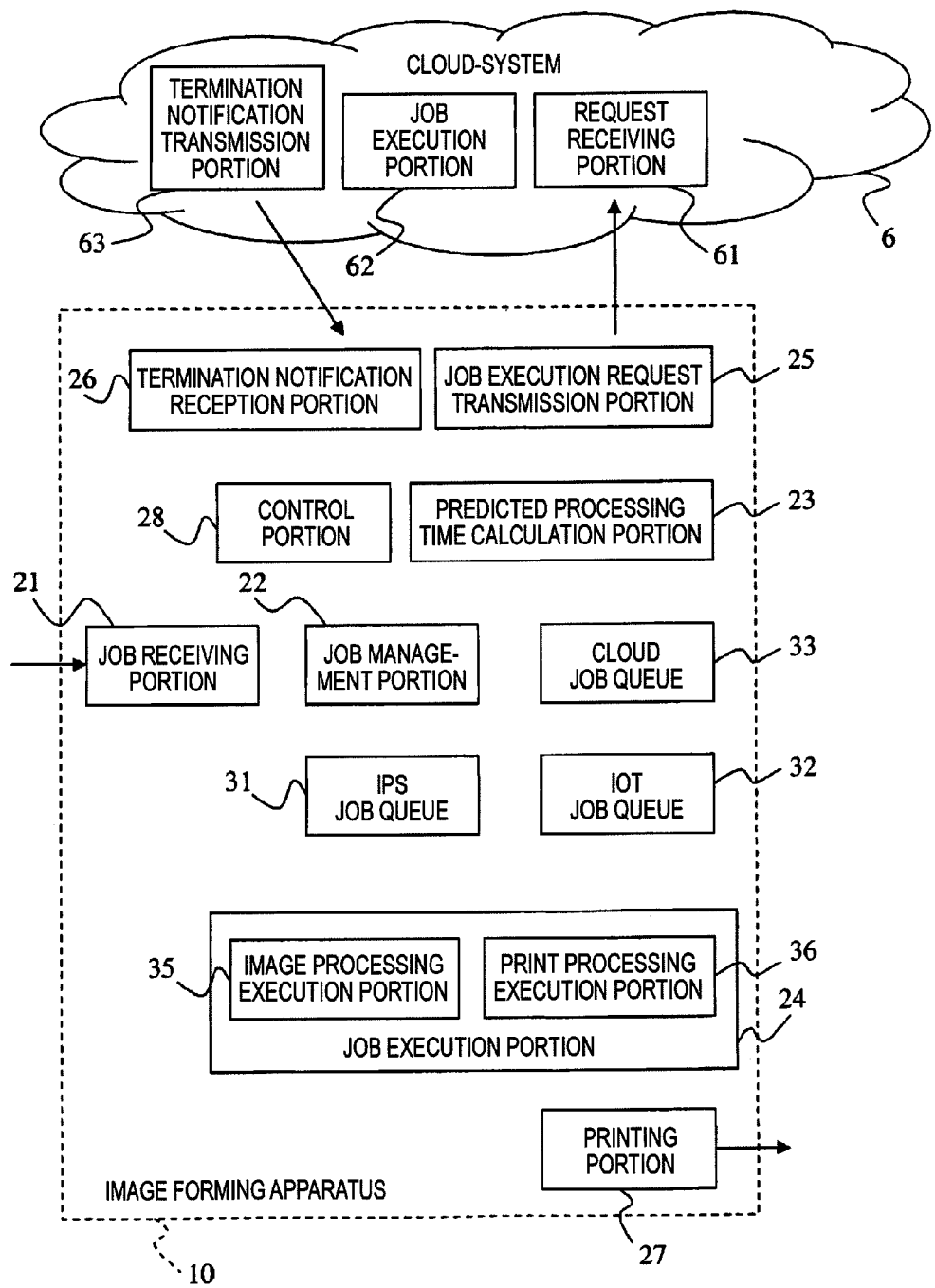
FIG. 3 is a diagram illustrating an example of the functional block configuration of the image forming apparatus 10 and a cloud-system 6 according to the present exemplary embodiment.

FIG. 3 is a diagram illustrating an example of the functional block configuration of the image forming apparatus 10 and the cloud-system 6 according to the exemplary embodiment.

The image forming apparatus 10 according to the present exemplary embodiment includes a job receiving portion 21, a job management portion 22, a predicted processing time calculation portion 23, a job execution portion 24, a job execution request transmission portion 25, a termination notification receiving portion 26, a print portion 27, a control portion 28, an IPS job queue 31, an IOT job queue 32, and a cloud job queue 33.

The job reception portion 21 receives a job generated according to a user's instruction issued from the operation panel 12. Alternatively, the job receiving portion 21 may be configured to receive a job transmitted from the PC 2. The control portion 28 performs overall control of the respective components 21 to 27 that may be implemented by programs.

Incidentally, it is assumed that the present exemplary embodiment handles a job including a pre-processing sub-job for generating information, and a post-processing sub job for outputting the generated information. If neither of the pre-processing sub-job and the post-processing sub-job is included by the job, the job is processed in a manner similar to a conventional one. In the case of the present exemplary embodiment, an image processing sub-job corresponds to the pre-processing sub-job. A print-processing sub job corresponds to the post-processing sub-job. It is assumed that the post-processing sub-job is executed basically using the IOT 14 provided as an output means. The pre-processing sub-job is executed basically using the IPS 15. However, the pre-processing sub-job may be executed using an external apparatus or system such as the cloud-system 6.

The job execution portion 24 sequentially executes sub-jobs registered in the job queues 31 and 32. In the case of the present exemplary embodiment, an image processing execution portion 35 sequentially executes image processing procedures respectively corresponding to image processing sub-jobs registered in the IPS job queues 31. A print processing execution portion 36 included in the job execution portion 24 sequentially executes print processing procedures respectively corresponding to print processing sub-jobs registered in the IOT job queue 32. The printing portion 27 prints images generated in the image processing by executing print processing. The job management portion 22 manages jobs received by the job receiving portion 21 and sub-jobs registered in any of the job queues 31 to 33. More specific processing to be executed by the job management portion 22 is that an image processing sub-job included in each job received by the job receiving portion 21 is registered in the IPS job queue 31 to execute an image processing procedure included in the sub-job and that this sub job is registered in the IOT job queue 32 to execute a print processing sub-job included in the received job upon completion of execution of the image processing procedure. Additional more specific processing is that, in order to execute a print processing sub-job included in a job including an image processing sub-job executed by the cloud-system 6 according to an instruction issued from the control portion 28, the job is registered in the JOT job queue 32. The control means according to the invention is implemented by a combination of the job management portion 22 and the control portion 28.

The predicted processing time calculation portion 23 calculates predicted processing times respectively needed for executing image processing and print processing when processing to be executed in each of n jobs ("n" is a natural number equal to or more than 2) received by the job receiving portion 21 is decomposed according to an instruction issued from the control portion 28 into image processing to be executed using the IPS 15, and print processing to be executed using the IOT 14. Thus, in the present exemplary embodiment, the predicted processing time calculation portion 23 is caused to calculate, as an example of an index value representing a load needed to execute each of the image processing and the print processing, a (predicted) processing time needed to execute each of the image processing and the print processing.

As described above, the control portion 28 performs the overall control of the respective components 21 to 27. In addition, the control portion 28 controls an order, in which image processing sub-jobs registered in the IPS job queue 31 are executed, by changing information registered in the IPS job queue 31 according to a result of comparison between the predicted print processing time of the print processing corresponding to an i-th job ($1 \leq i < n$), whose image processing is currently executed, and the predicted image processing time of the image processing corresponding to the i-th or later job. Information registered in the IPS job queue 31 is changed by instructing the job management portion 22. An example of changing the information registered in the IPS job queue 31 is performed as follows. That is, if the predicted image processing time of the image processing corresponding to the (i+1)-th job is longer than that of the image processing corresponding to the i-th job, the load of the image processing corresponding to the (i+1)-th job is assumed to be large. Then, the (i+1)-th job is deleted from the IPS job queue 31. In addition, the image processing sub-job for executing the image processing corresponding to the (i+1)-th job is registered in the cloud job queue 33. Incidentally, whether the load of the image processing corresponding to the (i+1)-th job is large is determined according to the relative relationship in length between the predicted print processing time and the predicted image processing time and not according to the absolute amount of each of the predicted processing times.

The job execution request transmission portion 25 transmits, according to an instruction issued from the control portion 28, an execution request for executing an image processing sub-job registered in the cloud job queue 33. Thus, the job execution request transmission portion 25 instructs the cloud-system 6 provided as an example of an external job execution apparatus to execute the image processing. The termination notification reception portion 26 receives a termination notification which is transmitted by the cloud-system 6 in order to notify that the image processing executed by the cloud-system 6 in response to the execution request for executing the image processing sub-job registered in the cloud job queue 33 is terminated.

Image processing sub-jobs for executing image processing procedures respectively included in the jobs are partly accumulated in the IPS job queue 31. Print processing sub-jobs for executing print processing are accumulated in the IOT job queue 32. The remaining ones of the image processing sub-jobs are accumulated in the cloud job queue 33, similarly to the IPS job queue 31. Image processing sub-jobs respectively included in jobs are accumulated in one of the IPS job queue 31 and the cloud job queue 33. The image processing sub-jobs accumulated in the IPS job queue 31 are executed by the image processing execution portion 35, while the image processing sub-jobs accumulated in the cloud job queue are executed by the cloud-system 6.

Each of the components 21 to 28 of the image forming apparatus 10 is implemented by a program running on the CPU 11 mounted in the built-in computer of the image forming apparatus 10 or by the device mounted on the image forming apparatus 10, or by the cooperation between the program and each device mounted on the image forming apparatus 10. For example, the job receiving portion 21 may be implemented by the cooperation between the program for receiving jobs, and the operation panel 12 or the network I/F 19. The image processing execution portion 35 may be implemented by a circuit incorporated into the IIT 13 or by the cooperation between the image processing program and the IIT 13. The print processing execution portion 36 may be implemented by a circuit incorporated into the IOT 14 or by the cooperation between a print processing program and the IOT 14. The job execution request transmission portion 25 may be implemented by a circuit incorporated into the network I/F 19 or by the cooperation between a transmission processing program and the network I/F 19. The termination notification reception portion 26 may be implemented by a circuit incorporated into the network I/F 19 or by the cooperation between a reception processing program and the network I/F 19.

The IPS job queue 31, the IOT job queue 32, and the cloud job queue 33 may be implemented by a storage means such as the RAM 17 or the HDD 18.

The programs used in the present exemplary embodiment may be provided not only by the communication means but by being stored in a computer-readable recording medium such as a compact disc read-only memory (CD-ROM) or a digital versatile disc read-only memory (DVD-ROM). The programs provided from the communication means and the recording media are installed in the computer. The CPU of the computer sequentially executes the programs installed therein. Thus, various processes are implemented.

Figure 4:
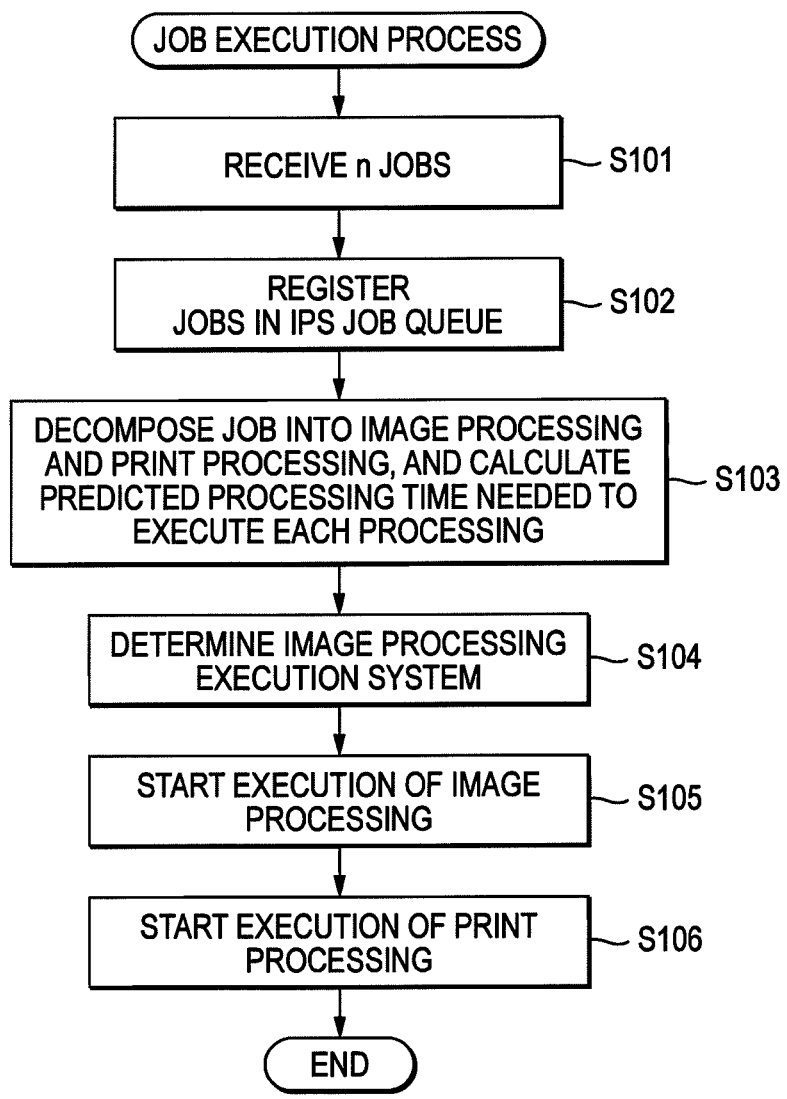
FIG. 4 is a flowchart illustrating a job execution process according to the present exemplary embodiment.
Figure 5:
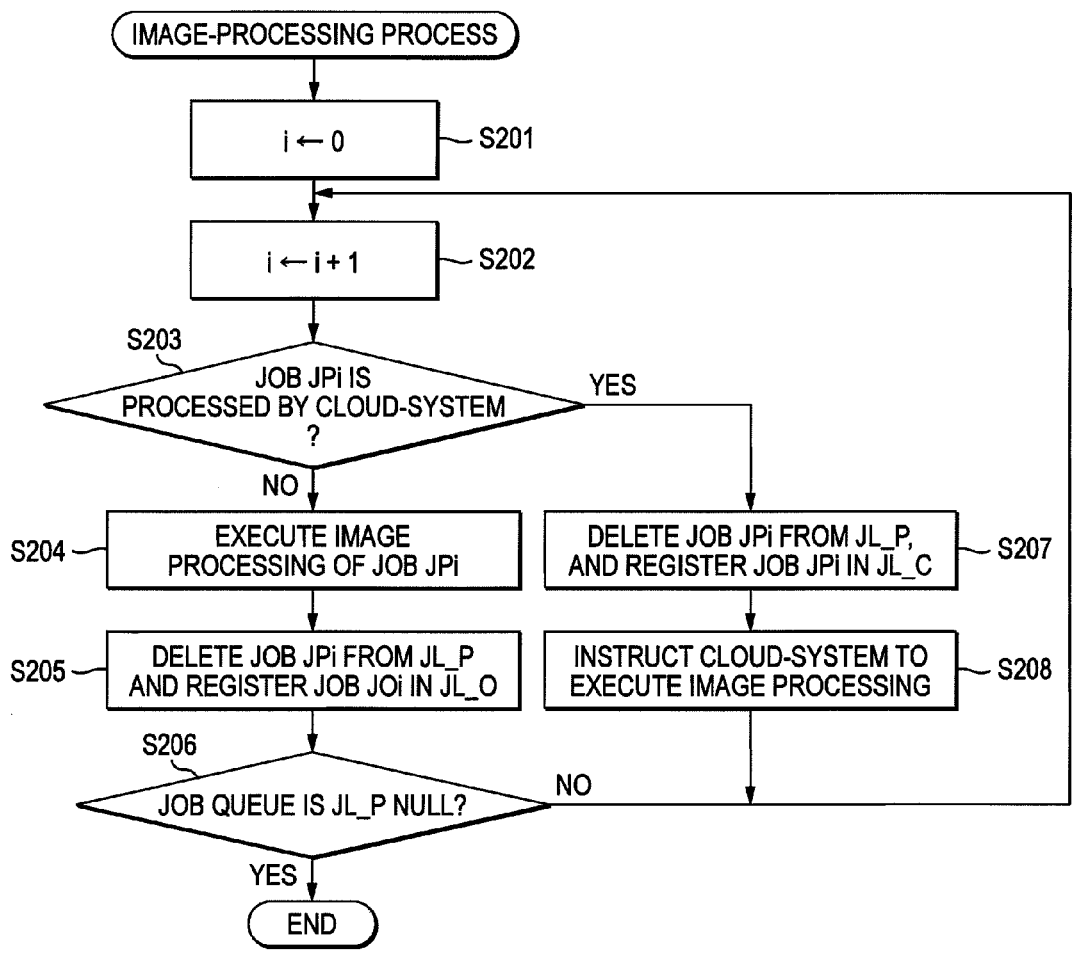
FIG. 5 is a flowchart illustrating an image-processing process included in the job execution process according to the present exemplary embodiment.
Figure 6:
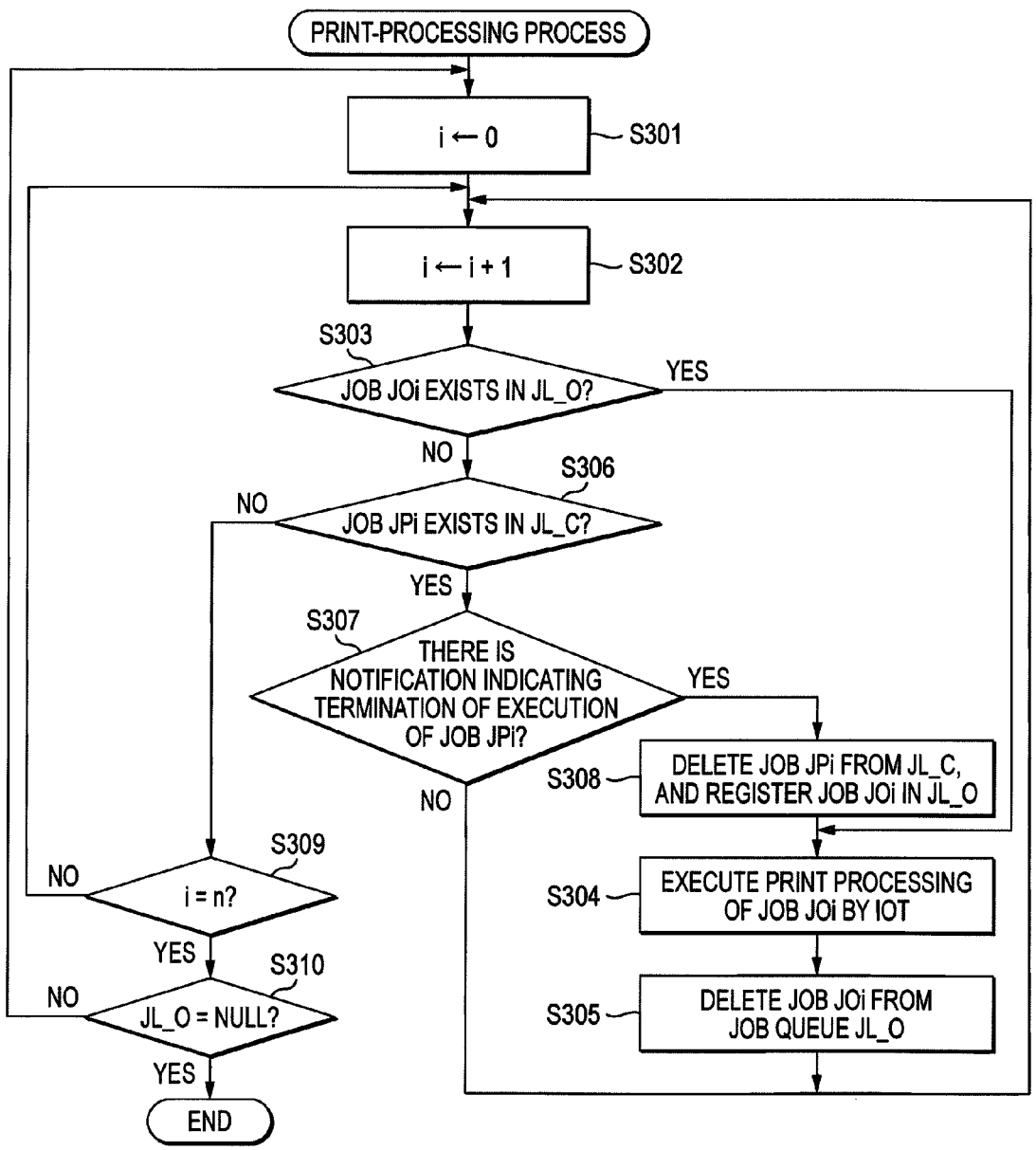
FIG. 6 is a flowchart illustrating a print-processing process included in the job execution process according to the present exemplary embodiment.

Next, a job execution process according to the present exemplary embodiment is described below with reference to flowcharts illustrated in FIGS. 4 to 6.

In step S101, the job receiving portion 21 collectively receives n jobs. Then, the job management portion 22 registers the image processing sub-jobs in the IPS job queue 31 in the order of receiving the jobs in step S102. When the received jobs are registered in the IPS job queue 31, in step S103, the predicted processing time calculation portion 23 decomposes each job into an image processing sub-job and a print processing sub-job according to an instruction issued from the control portion 28. In addition, according to the present exemplary embodiment, the predicted processing time calculation portion 23 calculates a predicted processing time needed to execute each of the image processing and the print processing. In the present exemplary embodiment, the predicted image-processing time needed to execute the image processing, and the predicted print-processing time needed to execute the print processing are generically referred to as predicted processing times. According to the present exemplary embodiment, it is assumed that the length of each processing time depends upon the magnitude of the load needed to execute the associated processing.

FIG. 7 illustrates an example of a job list of jobs received in the present exemplary embodiment. The image processing sub-jobs J1 to J4 received by the job receiving portion 21 are registered in the IPS job queue 31 in the order of ordinal numbers 1 to 4 illustrated in FIG. 7. FIG. 7 illustrates the file names of electronic documents serving as a processing target in each job, the number of printed copies of the electronic documents, the number of pages of each of the electronic documents, and the types thereof. FIG. 7 also illustrates predicted image processing times P1 to P4 needed for image processing corresponding to each job calculated by the predicted processing time calculation portion 23, and predicted print processing times O1 to O4 needed for print-processing corresponding to each job, in addition to information of the documents. That is, the predicted image processing time corresponding to the job J1 is P1, while the predicted print processing time corresponding thereto is O1. Each predicted processing time may be calculated referring to attribute values concerning jobs, such as an output paper size, a resolution, an original-document size, and an image processing type, in addition to the number of copies, and that of pages illustrated in FIG. 7.

In the present exemplary embodiment, the IPS job queue 31 serving as a sub-job queue for executing image processing using the IPS 15, and the IOT job queue 32 serving as a sub-job queue for executing print processing using the IOT 14 are provided separately from each other. In addition, the cloud job queue 33 serving as a sub-job queue for executing image processing unit the external cloud-system 6 is provided therein. In the present exemplary embodiment, a job list corresponding to the IPS job queue 31 is designated as JL_P. A job list corresponding to the IOT job queue 32 is designated as JL_O. A job list corresponding to the cloud job queue 33 is designated as JL_C. An image processing sub job of a job Ji ($1 \leq i \leq n$) to be registered in one of the job queues 31 to 33 is designated as JPi, and a print processing sub-job of the job Ji is designated as JOi. However, sometimes, for simplicity of description, the image processing sub job of the job Ji is referred to as the "job JPi", and the print-processing process sub-job of the job Ji is referred to as the "job JOi".

Figure 8A:
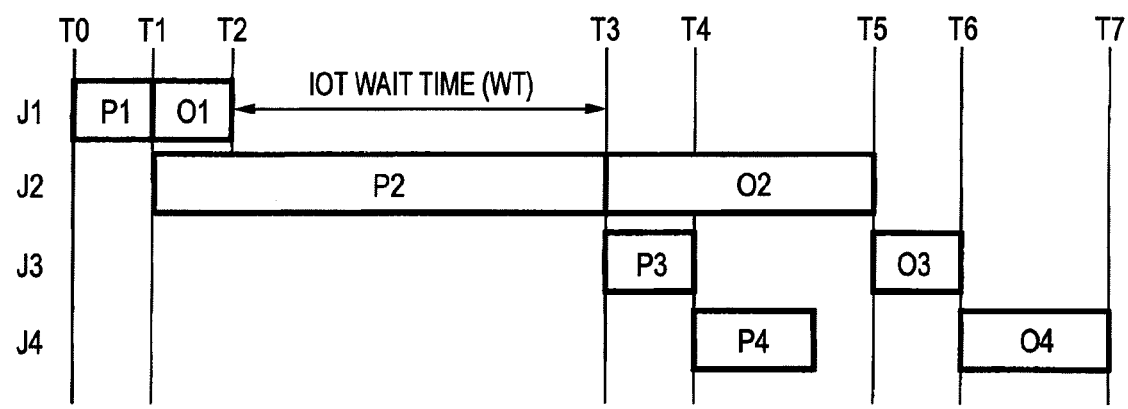
FIG. 8A is a conceptual chart illustrating the relationship among the lengths of the predicted image processing times P1 to P4 and the predicted print processing times O1 to O4 of the jobs illustrated in FIG. 7 by arranging the jobs in chronological order.
Figure 8B:
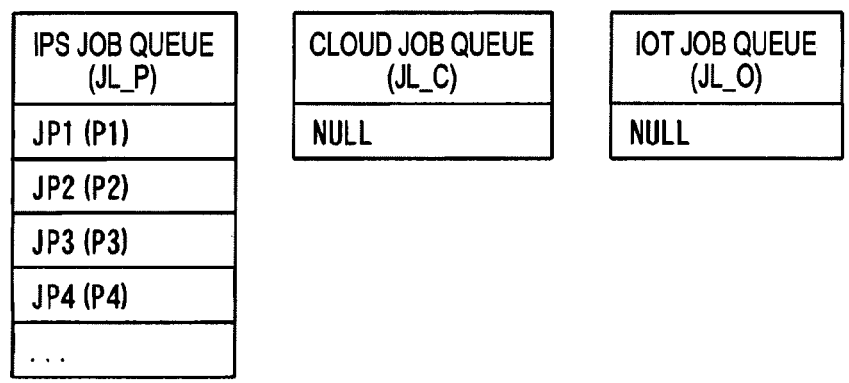
FIG. 8B is a table illustrating a registration status in which each job illustrated in FIG. 8A is registered in an associated job queue.

FIG. 8A is a conceptual chart illustrating the relationship among the lengths of the predicted image processing times P1 to P4 and the predicted print processing times O1 to O4 of the jobs illustrated in FIG. 7 by arranging the jobs in chronological order. FIG. 8B is a table illustrating a registration status in which each job illustrated in FIG. 8A is registered in an associated job queue. Referring to FIG. 8B, it is found that the jobs JP1 to JP4 are registered in the IPS job queue 31 in this order, and that at that time, the image processing corresponding to the leading job JP1 is not finished. The print processing sub-job JOi of each job is a process for printing a result of the image processing of the job. Thus, at that time (i.e., at any moment between moments T0 to T1) at which no image processing sub-jobs are finished, no print processing sub-jobs are accumulated in the IOT job queue 32. The image-processing process JPi corresponding to the job Ji is accumulated in the IPS job queue 31 until an image processing execution system is determined in the subsequent process. Accordingly, at that time, no image processing sub-jobs are accumulated in the cloud job queue 33. In FIG. 8B, "NULL" designates a vacant state in which no jobs are accumulated therein. In the drawings following FIG. 8B, such a state is designated similarly. It is assumed that in FIG. 8B, the predicted processing times are described in parentheses, respectively.

FIG. 8A illustrates the following information. That is, after the execution of the image processing sub-job JP1 (whose predicted image processing time is P1) corresponding to the first job J1, which is registered in the IPS job queue 31, the IPS 15 continuously executes the job JP2 (whose predicted image processing time is P2) corresponding to the second job J2. Then, the IPS 15 continuously executes the job JP3 (whose predicted image processing time is P3) corresponding to the third job J3, and that JP4 (whose predicted image processing time is P4) corresponding to the fourth job J4. In the execution of the image processing, the IPS 15 has no wait time.

On the other hand, the IOT 14 used for execution of the print processing executes such processing from the print processing JO1 (whose predicted print processing time is O1) corresponding to the first job J1 to that (whose predicted print processing time is O4) corresponding to the fourth job J4 sequentially. However, in the case of the print processing of this example, the predicted print processing time O2 corresponding to the second print processing sub job JO2 is longer than that O1 corresponding to the immediately preceding first print processing sub-job O1. Thus, a wait time WT (=T3−T1+O1) occurs until the print processing sub-job JO2 corresponding to the job J2 is executed since the print processing sub-job JO1 corresponding to the job J1 is executed. That is, when the jobs are processed in the order of receiving the jobs, a wait time of the IOT 14 is generated according to the length of each of the image processing time and the print processing time, so that the operation rate of the IOT 14 may be reduced. Especially, the operation rate of the IOT 14 is susceptible to the relationship in length between the predicted print processing time of the print processing of the i-th job ($1 \leq i < n$) and the predicted image processing time of the image processing corresponding to the immediately-succeeding (i+1)-th job. Thus, according to the present exemplary embodiment, in step S104, whether a wait time is generated in the IOT 14 is preliminarily validated by referring to the predicted processing time calculated in step S103. Then, an image processing execution system for executing each sub job once registered in the IPS job queue 31 is determined anew. This process is described in more detail below.

That is, the control portion 28 compares the predicted image processing time corresponding to the i-th job ($1 \leq i < n$) registered at a leading location in the IPS job queue 31 with that corresponding to the (i+1)-th job registered therein. It is likely that at the present moment, the execution of the image processing has already been started. According to the example illustrated in FIGS. 8A and 8B, the predicted print processing time O1 corresponding to the job J1 and the predicted image processing time P2 corresponding to the job J2 are compared with each other. If it is found, as a result of the comparison, that $O1 \geq P2$, no wait time of the IOT 14 is generated. Thus, the job JP2 is set to remain registered in the IPS job queue 31 and to be executed by the IPS 15. That is, the image processing execution system is determined to be the IPS 15.

On the other hand, if it is found, as a result of the comparison, that $O1 < P2$, a wait time of the IOT 14 is generated as illustrated in FIG. 8A. That is, if the job JP2 is executed by the IPS 15, a wait time of the IOT 14 is generated. Thus, in this case, the job JP2 is executed by the cloud-system 6. That is, the image processing execution system is determined to be the cloud-system 6. In this case, as will be described below, the job JP2 is moved from the IPS job queue 31 to the cloud job queue 33. More particularly, the job JP2 is deleted from the IPS job queue 31 and registered in the cloud job queue 33. This movement of the image processing sub job is performed by the job management portion 22 according to an instruction issued from the control portion 28.

Figure 9A:
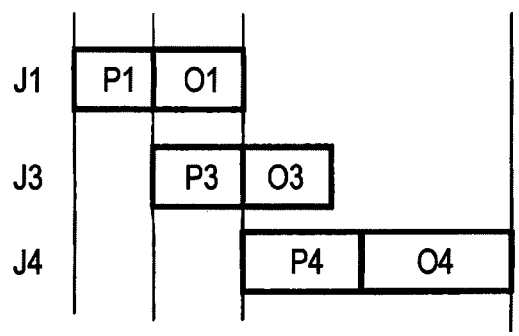
FIG. 9A is a conceptual chart illustrating the relationship among the lengths of the predicted image processing times and the predicted print processing times of the jobs by arranging the jobs in chronological order in a case where it is determined that the job JP2 illustrated in FIG. 8A is executed utilizing the cloud-system 6.

As described above, according to the present exemplary embodiment, the image processing execution system is determined according to a result of the comparison between the predicted print processing time corresponding to the i-th job and the predicted image processing time corresponding to the (i+1)-th job. The contents of the determination are used when an image-processing process to be described below is executed. Thus, the contents of the determination are temporarily stored in the RAM 17 or the like. The following description is made by assuming that the image processing execution system is determined to be the cloud-system 6, because only the image processing time corresponding to the image-processing JP2 of the job J2 among the received jobs J1 to J4 is longer than that of the print processing corresponding JO1 to the immediately-precedent job J1. The contents of information registered in the IPS job queue 31 are changed, because the job JP2 is deleted therefrom. The image processing execution portion 35 executes the job JPi at a corresponding turn in a changed sequence of the jobs arranged in the IPS job queue 31. FIG. 9A illustrates a state at that time.

If the image processing execution system corresponding to each of the received jobs J1 to J4 in the above manner, in steps S105 and 106, the job execution portion 24 starts the execution of the image processing and that of the print processing according to instructions issued from the control portion 28. However, even when the execution of the print processing is started, the print processing is in a standby state until an image processing sub-job is registered in the IOT job queue 32. Either of the execution of the image processing and that of the print processing may be started earlier.

Next, the image processing according to the present exemplary embodiment may be described hereinafter with reference to a flowchart illustrated in FIG. 5.

First, in step S201, the control portion 28 initializes a job identification variable i to 0. Then, in step S202, a job to be processed is specified by adding 1 to the variable i. Next, the image processing execution system determined in the aforementioned step 104 is referred to in step S203. If the image processing execution system corresponding to the job JPi is the IPS 15 (N in step S203), the image processing execution portion 35 executes the job JPi corresponding to the job Ji registered at the top of the job list of the IPS job queue 31 (step S204). Upon completion of the job JPi, in step S205, the job management portion 22 deletes the job JPi corresponding to the job Ji from the job list of the job queue 31, and registers the print processing sub-job JOi of the job Ji in the list of the IOT job queue 32. According to a setting example illustrated in FIG. 9A, the job JP1 is executed using the IPS 15.

Because the IPS job queue 31 is not a vacant-state "NULL" (N in step S206), the process returns to step S202 in which the job J2 to be processed is specified by adding 1 to the variable i. Next, the image processing execution system determined in the aforementioned step 104 is referred to. In the setting example according to the present exemplary embodiment, the image processing execution system for the job JP2 is determined to be the cloud-system 6. Thus, if the image processing execution system for the job JP2 is the cloud-system 6 (Y in step S203), the control portion 28 instructs the cloud-system 6 to execute the job JP2. To that end, in step S207, according to instructions issued from the control portion 28, the job management portion 22 deletes the job JP2 from the job list of the IPS job queue 31 and registers the image processing sub-job JP2 in the job list of the cloud job queue 33. Then, in step S207, the job execution request transmission portion 25 instructs the execution of the job JP2 by transmitting a job execution request to the cloud-system 6 according to an instruction issued from the control portion 28 (in step S208). The job execution request includes information necessary for executing the job JP2 and sending a result of the execution, such as information specifying the contents of the execution of the job JP2, information specifying a requestor of the job execution request, e.g., an Internet protocol (IP) address of the image forming apparatus 10, or a mail address of the requestor, and a method for returning a result of the execution of the job.

In the cloud-system 6, a request receiving portion 61 receives a job execution request from the image forming apparatus 10. Then, a job execution portion 62 executes the job JP2 in response to the request. A termination notification transmission portion 63 notifies the image forming apparatus 10 serving as the job execution requestor of the termination of the execution of the job JP2. Regarding this notification, a result of the execution of the job may be sent back to the requestor as the notification of the termination of the job. Alternatively, the termination notification transmission portion 63 may be configured to send back only a termination notification and to return a result of the execution of the job to the image forming apparatus 10 in response to a transmission request issued from the image forming apparatus 10. It may preliminarily be determined that the exchange of a termination notification and an execution result is performed between the image forming apparatus 10 and the cloud-system 6. Alternatively, the image forming apparatus 10 may instruct, when a job execution request is made, the cloud-system 6 to perform such exchange.

Then, because the IPS job queue 31 is not a vacant-state "NULL" (N in step S206), the process returns to step S202 in which a job J3 to be processed is specified by adding 1 to the variable i. According to the present exemplary embodiment, it is assumed that another job JP4 is also executed using the IPS 15. That is, the contents of the processing of the jobs JP3 and JP4 are similar to those of processing of the job JP1. Therefore, the description of the processing of the job JP4 is omitted.

Thus, if the IPS job queue 31 is a vacant-state "NULL" (Y in step S206), the image processing is finished.

Figure 9B:
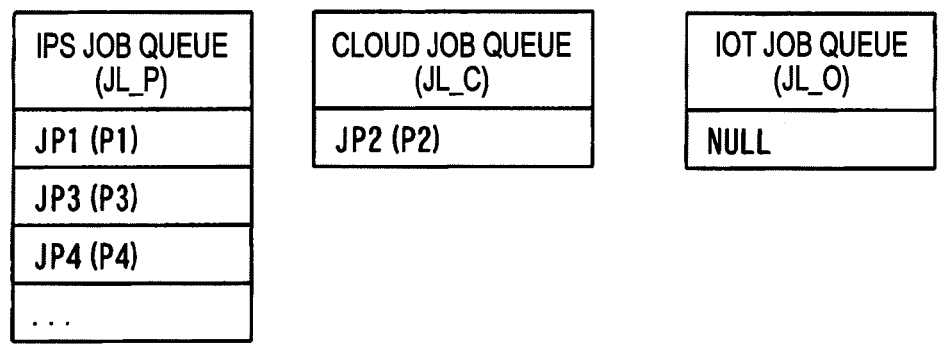
FIG. 9B is a table illustrating a registration status in which each job illustrated in FIG. 9A is registered in an associated job queue.

FIG. 9A is a conceptual chart illustrating the processing times of the jobs by arranging the jobs in chronological order in a case where it is determined that the job JP2 illustrated in FIG. 8A is executed utilizing the cloud-system 6. As is understood from the comparison between FIGS. 8A and 9A, the cloud-system 6 is utilized for executing the job JP2. Thus, the IOT wait time WT disappears. FIG. 9B illustrates the job lists of the jobs registered in the IPS job queue 31 and the cloud job queue 33 in the case of utilizing the cloud-system 6 for the execution of the job JP2. As illustrated in FIG. 9B, the job JP2 is moved from the IPS job queue 31 to the cloud job queue 33.

Figure 10A:
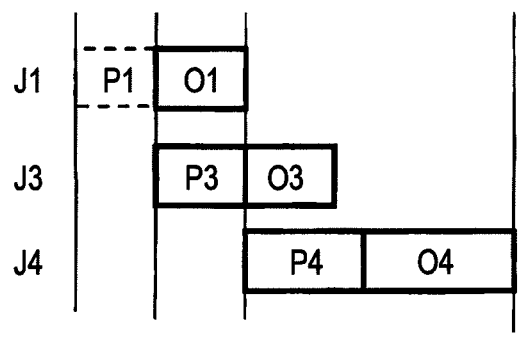
FIG. 10A is a conceptual chart illustrating the relationship among the lengths of the predicted image processing times and the predicted print processing times of the jobs by arranging the jobs in chronological order in a case where the job JP1 illustrated in FIG. 9A is finished.
Figure 10B:
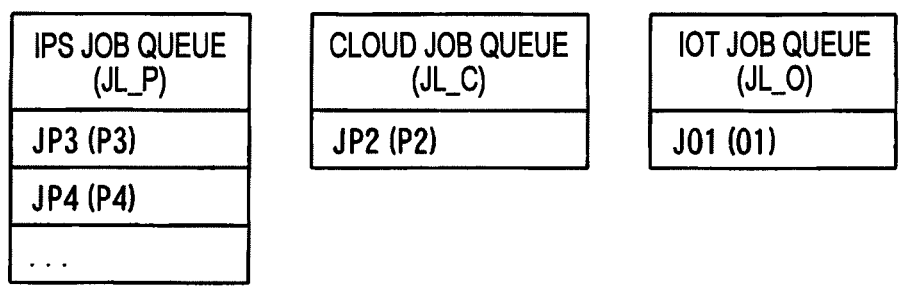
FIG. 10B is a table illustrating a registration status in which each job illustrated in FIG. 10A is registered in an associated job queue.

FIG. 10A is a conceptual chart illustrating the processing times of the jobs by arranging the jobs in chronological order in a case where the image processing sub job JP1 corresponding to the job J1 illustrated in FIG. 9A is finished. In FIG. 10A, the job JP1 (whose predicted image processing time is P1) is illustrated with dashed lines to indicate that the job JP1 is finished. FIG. 10B is a table illustrating a registration status in which the image processing sub-job JP1 corresponding to the job J1 is deleted from the IPS job queue 31 and in which the print processing sub-job JO1 corresponding to the job J1 is registered in the job list of the IOT job queue 32. That is, this table illustrates the registration status of each of the job queues 31 to 33 at the time at which processing to be performed in step S205 is finished when the variable i has a value of 1, and at which processing to be performed in step S207 is finished when the variable i has a value of 2.

Next, a print-processing process according to the present exemplary embodiment is described with reference to a flowchart illustrated in FIG. 6.

First, in step S301, the variable i for identifying a job is initialized to 0 by the control portion 28. Then, in step S302, a job to be processed is specified by adding 1 to the variable i. Next, in step S303, the control portion 28 confirms whether a print processing sub-job JOi is present in the IOT job queue 32. If the print processing sub-job JOi is present in the IOT job queue 32 (Y in step S303), in step S304, the print processing execution portion 36 executes the print processing sub-job JOi corresponding to the job Ji registered at the top of the job list of the IOT job queue. Then, upon completion of the print processing sub-job JOi, in step S305, the job management portion 22 deletes the print processing sub-job JOi corresponding to the job Ji from the job list of the IOT job queue 32.

If i=1, the job JO1, i.e., the print processing sub-job corresponding to the job J1 is executed in the following manner.

That is, the process returns to step S302 in which a job to be processed is specified by adding 1 to the variable i. If i=2, the control portion 28 confirms whether the job JO2 is present in the IOT job queue 32. However, at that time, a termination notification indicating the termination of the job JP2 is not confirmed yet. Thus, it is assumed that the job JO2 is non-registered in the IOT job queue 32 (N in step S303). Then, the control portion 28 confirms whether a job JP2 is present in the cloud job queue 33. Regarding this, as described above, under the condition that the control portion 28 requests the cloud-system 6 to execute the print processing sub job JP2 and that the aforementioned job JP2 is not finished, the job JP2 should be present in the cloud job queue 33. In this case (Y in step S306), the control portion 28 confirms whether the execution of the job JP2 is finished. This means that the execution of the job JP2 is finished, if the termination notification reception portion 26 has already received the terminal notification transmitted from the termination notification transmission portion 63. Alternatively, the control portion 28 may be set to make the termination notification reception portion 26 inquire of the cloud-system 6 whether the execution of the job JP2 is finished.

If the control portion 28 doesn't receive a termination notification from the terminal notification reception portion 26, so that the execution of the job JP2 is not finished (N in step S307), the process returns to step S302.

On the other hand, if the control portion 28 receives the termination notification from the termination notification reception portion 26 to thereby confirm that the execution of the job JP2 is finished (Y in step S307), in step S308, the job management portion 22 deletes the image processing sub-job JP2 of the job J2 from the cloud job queue 33, and registers the print processing sub-job JO2 of the job J2 in the IOT job queue 32. After that, similarly to the case of the job JO1, in step S304, the print processing execution portion 36 executes the print processing sub-job JO2 of the job J2 registered at the top of the job list of the IOT job queue 32. Upon completion of the print processing sub-job JO2, in step S305, the job management portion 22 deletes the print processing sub-job JO2 of the job J2 from the job list of the IOT job queue 32.

The process returns to step S302 in which a job to be processed is specified by adding 1 to the variable i. If i=3, in a case where the image processing sub-job JP3 corresponding to the job J3 is finished, and where the print processing sub-job JO3 corresponding to the job J3 is registered at the top of the IOT job queue 32 (Y in step S303), in steps S304 and S305, the print processing sub-job JO3 is processed, similarly to the aforementioned job JO1. Alternatively, if the image processing sub-job JP3 corresponding to the job J3 is not already finished, the print processing sub-job JO3 corresponding to the job J3 is not registered in the IOT job queue 32 (N in step S303), and is not also registered in the cloud job queue 33 (N in step S306). In addition, the ordinal number of a currently processed job doesn't reach the number (n=4) of received jobs (N in step S309). Thus, regarding the job J3, the apparatus is not in a state in which the print processing to be executed by the IOT 14 may be executed. Thus, the process returns to step S302.

Next, in step S302, a job to be processed is specified by adding 1 to the variable i. If i=4, because the job JP3 is not finished, the job JP4 is not finished. Thus, the apparatus is not in a state in which the print processing is executed. Both the variable i and the number N are equal to 4 (Y in step S309). If the job list JL_O is in a vacant state "NULL" (N in step S310), the process returns to step S301. Then, the above process is executed repeatedly.

Figure 11A:
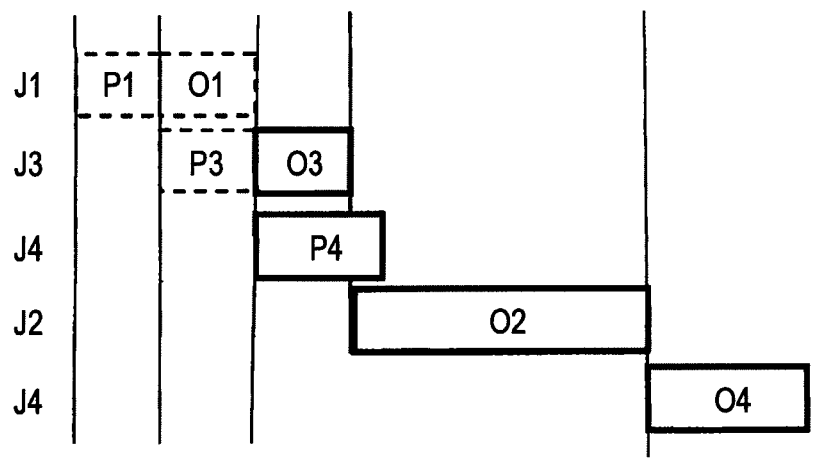
FIG. 11A is a conceptual chart illustrating the relationship among the lengths of the predicted image processing times and the predicted print processing times of the jobs by arranging the jobs in chronological order in a case where the jobs JP1, JO1, and JP3 illustrated in FIG. 10A are finished.
Figure 11B:
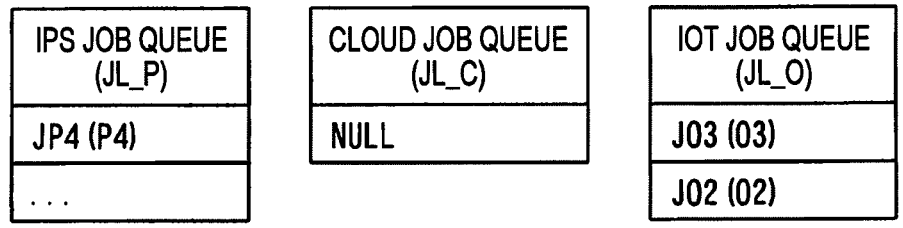
FIG. 11B is a table illustrating a registration status in which each job illustrated in FIG. 11A is registered in an associated job queue.

FIG. 11A is a conceptual chart illustrating the relationship of the jobs by arranging the jobs in chronological order in a case where the image processing JP1, the print processing JO1 of the job J1, and the image processing JP3 of the job J3 illustrated in FIG. 10A are finished. Similarly to FIG. 10A, FIG. 11A illustrate, with dashed lines, the image processing and the print processing that are finished. According to FIG. 11A, the image processing sub-jobs JP1 and JP3 are finished. Thus, as illustrated in FIG. 11B, only the job JP4 is present in the IPS job queue 31. Because the print processing sub-job JO1 is finished, the job JO1 is not registered in the IOT job queue 32, as illustrated in FIG. 11B. On the other hand, because the job JO3 is not finished, the job JO3 is present in the IOT job queue 32. Because the job JP2 is finished upon completion of the job JP3, the job JO3 is registered in the IOT job queue 32 before the job JO2, as illustrated in FIG. 11B. However, in order to arrange the jobs in the queue in an original order, the job JO2 may be registered therein before the job JO3 even when the job JP2 is finished upon completion of the job JP3.

In addition, differently from FIG. 10A, FIG. 11A illustrates the job JO2 (whose predicted print processing time is O2), the processing of which is not finished. Thus, it may be grasped that at the present time, the processing of the job JP2 by the cloud-system 6 is finished. Because the job JO2 is not finished yet, the job JO2 is present in the IOT job queue 32, similarly to the job JO3. It may be grasped that as illustrated in FIGS. 11A and 11B, the job JP2 executed by the cloud-system 6 is finished after the execution of the job JP3 by the IPS 15 is finished.

Exemplary Embodiment 2

In the above Exemplary embodiment 1, on the assumption that jobs are executed in an order of registering the jobs in the IPS job queue 31, the apparatus is configured so that in a case where the image processing sub-job JPk corresponding to the job Jk (k=i+1) is longer than the print processing sub-job Ji ("i" is a natural number) corresponding to the job Ji in the length of the predicted processing time corresponding to the immediately preceding job, the cloud-system 6 is asked for the execution of the image processing sub job JPk corresponding to the job Jk.

Exemplary embodiment 2 doesn't employ the above assumption and is featured in that the received jobs are rearranged in another order before image-processing execution systems respectively corresponding to the jobs are determined. More specifically, the following process is performed between steps S103 and S104 illustrated in FIG. 4.

First, it is assumed that the image processing sub-job JP1 corresponding to the leading one J1 of the received jobs J1 to J4 is initially executed at the IPS 15. This is because, e.g., the execution of the leading one of the received jobs has already been started. Then, the control portion 28 obtains the difference between the print processing sub-job JO1 corresponding to the job J1 and each of the image processing sub-jobs JP2, JP3, and JP4 respectively corresponding to the remaining jobs 2, 3, and 4 that haven't already been executed. In addition, the control portion 28 obtains the absolute value of each of the differences. Then, the control portion 28 determines, as the job to be executed subsequently to the job J1, the job corresponding to a minimum absolute value of the difference. That is, the job corresponding to the predicted image processing time closest to the predicted print processing time of the print processing sub job JO1 is selected as the job to be executed subsequently to the job J1. The selected job is now assumed to be the job J3.

Next, similarly to the above case of the job JO3, the control portion 28 obtains the difference between the print processing sub-job JO3 corresponding to the job J1 and each of the image processing sub-jobs JP2 and JP4 respectively corresponding to the remaining jobs J2 and J4 that haven't already been executed. In addition, the control portion 28 obtains the absolute value of each of the differences. Then, the control portion 28 determines, as the job to be executed subsequently to the job J3, the job corresponding to a minimum absolute value of the difference. That is, the job corresponding to the predicted image processing time closest to the predicted print processing time of the print processing sub-job JO3 is selected as the job to be executed subsequently to the job J3.

The above process is performed repeatedly until the number of the remaining jobs is 1. Thus, the remaining single job is determined as the job to be executed last time.

Thus, an order in which the jobs are executed is determined. Then, an image processing execution system for executing the image processing sub-job corresponding to each job is determined. The present exemplary embodiment differs from Exemplary embodiment 1 in that if the absolute value |JOj−JPk| calculated in the above process has a value larger than a predetermined threshold, the image processing execution system for executing the subsequent job is determined to be the cloud-system 6. That is, if |JOj−JPk|>th, the image processing execution system for executing the image processing sub-job JPk corresponding to the job Jk is determined to be the cloud-system 6. Incidentally, "j" and "k" are natural numbers, and "th" represents the threshold value. The image processing and the print processing according to Exemplary embodiment 2 are similar to those according to Exemplary embodiment 1. Therefore, the description of the image processing and the print processing is omitted.

As described above, according to Exemplary embodiment 2, the print processing for printing a result of the image processing is assumed to be executed using the IOT 14 of the image forming apparatus 10 which receives the jobs. Accordingly, all the print processing sub-jobs JO1 to JO4 including the print processing sub-job JO2 corresponding to the job J2, for the execution of which the cloud-system 6 is asked, are registered in the IOT job queue 32 and processed by the IOT 14. The present exemplary embodiment is directed to the enhancement of the operation rate of the IOT 14 serving as an output means for executing the print processing (i.e., post-processing) of the jobs. Although it is not assumed in the present exemplary embodiment that a plurality of output means are provided therein, it is not essential that the output means is incorporated in the image forming apparatus 10.

The present exemplary embodiment has been described by exemplifying the image forming apparatus 10 as a job execution apparatus. Accordingly, processing included in each job basically includes image processing such as image-data generation, image-data processing, and image-data conversion, and print processing such as the printing of the generated image data. Therefore, according to the present exemplary embodiment, the processing included in a job to be handled by the image forming apparatus 10 is roughly classified into image processing and print processing. The image processing is handled as pre-processing, while the print processing is handled as post-processing. However, the present exemplary embodiment is directed to the improvement of the operation rate of the output means used in the post-processing. Accordingly, the pre-processing using no output means may be further decomposed into a plurality of means.

Although the value of time serving as an index is used as an index value representing a load needed to execute each of the pre-processing and the post-processing, the index value according to the invention is not limited thereto. Other data may be used as the index, as long as such data may represent the degree of a load.

According to the present exemplary embodiment, the processing which is being executed is continuously executed without being interrupted. However, if it is determined, as a result of the comparison between the predicted processing times, to be better to interrupt image processing even in the halfway of the image processing and to ask the cloud-system 6 for the execution of the image processing, the cloud-system 6 is instructed to execute the image processing. At that time, a halfway result of the image processing having partway been completed may be sent to the cloud-system 6 as information for determining processing efficiency. Alternatively, the image processing may be re-executed from the beginning at the cloud-system 6.

In the foregoing description, the invention has been described by employing, as job-execution targets, jobs collectively received by the job receiving portion 21. However, in the case of receiving, during the execution of a job, another additional job, the additional job may be added to the aforementioned job-execution targets.

Although materials printed by the printing portion 27 have been described as an example of the form of output from the output means, e.g., electronic data of electronic files may be employed as another example of the form of output obtained as a result of the post-processing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A job execution apparatus, comprising:
    a receiving unit configured to receive each job;
    a calculation unit configured to calculate an index value representing a load needed to execute each of a pre-processing sub-job and a post-processing sub-job when each of n jobs (n is a natural number equal to or more than 2) is decomposed into a pre-processing sub-job for generating processed print data, and a post-processing sub-job for causing an output unit to output the processed print data generated by executing the pre-processing sub-job;
    a pre-processing execution unit configured to sequentially execute pre-processing sub-jobs which are respectively included in jobs received by the receiving unit and registered in a pre-processing sub-job queue;
    a post-processing execution unit configured to sequentially execute, upon completion of the pre-processing sub-jobs, post-processing sub-jobs which are respectively included in the received jobs and which are registered in a post-processing sub-job queue; and
    a control unit configured to control an order of executing the pre-processing sub-jobs at the pre-processing execution unit by referring to the index values which are calculated by the calculation unit and which are respectively correspond to the pre-processing sub-job and the post-processing sub-job of each of the received jobs, and by changing the order of executing the pre-processing sub-jobs registered in the pre-processing sub-job queue according to a result of comparison between a predicted post-processing time corresponding to the post-processing sub-job of an i-th job ($1 \leq i < n$) and the predicted pre-processing time corresponding to a pre-processing sub-job of a job subsequent to the i-th job.

2. The job execution apparatus according to claim 1, wherein if the control unit compares an index value corresponding to a post-processing sub-job of an i-th job and that corresponding to a pre-processing sub-job of an (i+1)-th job to thereby determine that a load needed to execute the pre-processing sub-job of the (i+1)-th job is large, the control unit deletes the (i+1)-th job from the pre-processing sub-job queue and instructs an external job execution apparatus to execute a pre-processing sub-job of the (i+1)-th job; and if the control unit receives from the external job execution apparatus a terminal notification representing termination of execution of the (i+1)-th job, the control unit registers a post-processing sub-job in the post-processing sub-job queue.

3. An image forming apparatus, comprising
a job execution apparatus according to claim 1,
wherein the output unit is an image output device mounted in the image forming apparatus;
the pre-processing sub-job is an image processing sub-job to be executed using at least one of the mounted image processing device and an external image processing device; and
the post-processing sub-job is a print processing sub-job to be executed using the image output device.

4. A non-transitory computer readable medium storing a computer readable program executable by a computer for causing a computer to execute a process, the process comprising:
receiving each job;
calculating an index value representing a load needed to execute each of a pre-processing sub-job and a post-processing sub-job when each of n jobs (n is a natural number equal to or more than 2) is decomposed into a pre-processing sub-job for generating processed print data, and a post-processing sub-job for causing an output unit to output the processed print data generated by executing the pre-processing sub-job;
sequentially pre-processing sub-jobs which are respectively included in jobs received by the receiving and registered in a pre-processing sub-job queue;
upon completion of the pre-processing sub-jobs, sequentially post-processing sub-jobs which are respectively included in the received jobs and which are registered in a post-processing sub-job queue; and
controlling an order of executing the pre-processing sub-jobs by referring to the index values which are calculated by the calculating and which respectively correspond to the pre-processing sub-job and the post-processing sub-job of each of the received jobs, and by changing the order of executing the pre-processing sub-jobs registered in the pre-processing sub-job queue according to a result of comparison between a predicted post-processing time corresponding to the post-processing sub-job of an i-th job ($1 \leq i < n$) and the predicted pre-processing time corresponding to a pre-processing sub-job of a job subsequent to the i-th job.

5. A job execution system, comprising:
a computer that outputs jobs; and
an image forming apparatus comprising:
a receiving unit configured to receive each job output by the computer;
a calculation unit configured to calculate an index value representing a load needed to execute each of a pre-processing sub-job and a post-processing sub-job when each of n jobs (n is a natural number equal to or more than 2) is decomposed into a pre-processing sub-job for generating processed print data, and a post-processing sub-job for causing the output unit to output the processed print data generated by executing the pre-processing sub-job;
a pre-processing execution unit configured to sequentially execute pre-processing sub-jobs which are respectively included in jobs received by the receiving unit and which are registered in a pre-processing sub-job queue;
a post-processing execution unit configured to sequentially execute, upon completion of the pre-processing sub-jobs, post-processing sub-jobs which are respectively included in the received jobs and which are registered in a post-processing sub-job queue; and
a control unit configured to control an order of executing the pre-processing sub-jobs at the pre-processing execution unit by referring to the index values which are calculated by the calculation unit and which respectively correspond to the pre-processing sub-job and the post-processing sub-job of each of the received jobs, and by changing the order of executing the pre-processing sub-jobs registered in the pre-processing sub-job queue according to a result of comparison between a predicted post-processing time corresponding to the post-processing sub-job of an i-th job ($1 \leq i < n$) and the predicted pre-processing time corresponding to a pre-processing sub-job of a job subsequent to the i-th job.

6. A non-transitory computer-readable recording medium having embodied thereon a program that causes an image forming apparatus to execute a method of processing print jobs, the method comprising:
receiving a first print job;
queuing the first print job in a first position in an image processing queue;
receiving a second print job;
queuing the second print job in a second position in the image processing queue, the second position immediately succeeding the first position in the image processing queue;
estimating an image output time of the image forming apparatus to output processed data of the first print job to an output medium;
estimating an image processing time of the image forming apparatus to perform image processing on unprocessed data of the second print job;
determining whether the image processing time exceeds the image output time; and
removing the second print job from the image processing queue and requesting an external job execution apparatus to perform the image processing on the unprocessed data of the second print job, in response to determining that the image processing time exceeds the image output time.

7. A non-transitory computer-readable recording medium having embodied thereon a program that causes an image forming apparatus to execute a method of processing print jobs, the method comprising:

receiving a plurality of print jobs;

queuing the plurality of print jobs in an image processing queue in order of receipt of the plurality of print jobs;

determining that an image output time of the image forming apparatus to output processed data of a print job among the plurality of print jobs to an output medium is less than an image processing time of the image forming apparatus to perform image processing on unprocessed data of a next print job among the plurality of print jobs immediately succeeding the print job in the order of receipt; and requesting an external job execution apparatus to perform the image processing on the unprocessed data of the second print job in response to determining that the image output time is less than the image processing time.

8. An image forming apparatus comprising:

a communication interface configured to receive a plurality of print jobs;

a memory configured to store (i) an image processing queue in which unprocessed print data of the plurality of print jobs is queued in order of receipt of the plurality of print jobs for performing image processing of the unprocessed print data in the order of receipt into processed print data and (ii) an image output queue in which the processed print data is queued for forming the processed print data to an output medium; and a processor configured to estimate an image output time to output processed print data of a print job among the plurality of print jobs in the image output queue, estimate an image processing time to perform the image processing of unprocessed data of a next print job in the image processing queue among the plurality of print jobs immediately succeeding the print job in the order of receipt, determine whether the image output time is less than the image processing time, and request an external job execution apparatus to perform the image processing of the unprocessed data of the next print job through the communication interface in response to determining the image output time is less than the image processing time.

* * * * *